United States Patent
Magoon

[15] 3,697,611
[45] Oct. 10, 1972

[54] OLEFIN-ALKYL IODIDE EXCHANGE

[72] Inventor: Eugene F. Magoon, Walnut Creek, Calif.

[73] Assignee: Shell Oil Company, New York, N.Y.

[22] Filed: Sept. 14, 1970

[21] Appl. No.: 72,162

[52] U.S. Cl. .................. 260/677 XA, 260/658 C
[51] Int. Cl. ............................................ C07c 11/12
[58] Field of Search ............ 260/677, 677 XA, 658 C

[56] References Cited

UNITED STATES PATENTS

| | | |
|---|---|---|
| 3,471,579 | 10/1969 | Kubicek ..................... 260/633 |
| 3,592,866 | 7/1971 | Magoon et al. ...... 260/677 XA |
| 2,392,739 | 1/1946 | Horeczy et al. ...... 260/677 XA |
| 2,392,740 | 9/1944 | Horeczy et al. ............. 260/677 |

*Primary Examiner*—Delbert E. Gantz
*Assistant Examiner*—J. Nelson
*Attorney*—Martin S. Baer and Howard W. Haworth

[57] ABSTRACT

Higher olefins are prepared by an exchange reaction between lower olefins and higher organic iodides according to equation I:

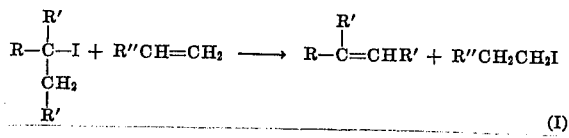

(I)

in the presence of a noble metal catalyst. For example, octene, cyclohexene and decene are produced by an exchange reaction between the corresponding iodides and ethylene in the presence of platinum on various supports, chloroplatinic acid, tris(triphenylphosphine)platinum or bis(triphenylphosphine)ruthenium tricarbonyl.

6 Claims, No Drawings

OLEFIN-ALKYL IODIDE EXCHANGE

BACKGROUND OF THE INVENTION

The preparation of olefins by the pyrolysis or dehydrohalogenation of the corresponding alkyl halide is known in the art. However, the resulting halogen acid is an undesirable, corrosive by-product. The pyrolysis reaction also results in the formation of other undesirable by-products, such as paraffins and structural isomers.

Alternatively, olefins have been prepared from alkyl halides in a two-step process, the alkyl halide being first converted to an alkanol and then dehydrated to the olefin.

SUMMARY OF THE INVENTION

It has now been found that olefins are prepared from aliphatic iodides in a one-step process by contacting in the presence of a noble metal catalyst a lower olefin with an aliphatic iodide having at least three more carbon atoms than the olefin to effect an exchange reaction wherein the product olefin has the same number of carbon atoms as the original aliphatic iodide. By way of illustration, the reaction of ethylene and 1-iododecane in the presence of a platinum catalyst produces 1-decene and ethyl iodide.

DESCRIPTION OF THE PREFERRED EMBODIMENTS

Lower Olefin

The lower olefin is an olefin hydrocarbon having two to five carbon atoms, particularly terminal, i.e., $\alpha$-olefins.

Preferred 1-alkenes include ethylene, propylene, butylene, isobutylene, and $\alpha$-amylene. A particularly preferred alkene is ethylene.

The Organic Iodide Reactant

The process of the invention is generally applicable to any organic iodide compound of from five to 61 carbon atoms containing a primary, secondary or tertiary iodine atom attached to a saturated carbon atom in which the remaining valences of the carbon atom are satisfied by bonding to hydrogen or carbon atoms. By the term "saturated" carbon atom is meant a carbon atom whose valences are satisfied by single bonds, that is, a carbon atom free from multiple carbon-carbon bonding.

The organic iodide reactant is a hydrocarbon iodide containing only atoms of carbon and hydrogen other than iodine or is a substituted hydrocarbon iodide compound additionally containing inert substituents.

One class of suitable iodide reactants is represented by the formula (I):

wherein R and R' independently are hydrogen or an organo group of one to 20 carbon atoms with the proviso that two organo R' groups may together with the two intervening carbon atoms form a carbocyclic ring with five to nine carbon atoms in the ring thereof.

The organo R and R' groups are hydrocarbyl, that is, contain only atoms of carbon and hydrogen, or are substituted-hydrocarbyl containing, besides atoms of carbon and hydrogen, other non-metallic atoms such as oxygen, nitrogen, and halogen, particularly halogen of atomic number from 9 to 53 inclusive, which atoms are present in functional groups such as alkoxy, aryloxy, carbalkoxy, alkanoyl, alkanoyloxy, cyano, halo and like groups having no active hydrogen atoms. A preferred class of non-hydrocarbyl substituents are halogens of atomic number from 17 to 53 inclusive.

Illustrative of hydrocarbyl R and R' groups are alkyl groups such as methyl, ethyl, propyl, isopropyl, butyl, pentyl, decyl, lauryl and stearyl; cycloalkyl groups such as cyclopropyl, cyclobutyl, cyclopentyl, cyclohexyl, methylcycloheptyl and cyclodecyl; alkenyl groups such as allyl, 4-butenyl and 9-decenyl; cycloalkenyl groups such as 2-cyclopentenyl, 3-cyclohexenyl, 4-methylcyclohexenyl-2, and 4-cyclooctenyl and 5-cyclodecenyl; alkynyl groups such as 2-propynyl, 3-butynyl and 5-decynyl; and aralkyl groups such as benzyl, 2-phenylethyl, 4-naphthylbutyl and 5-(p-tolyl)hexyl.

Illustrative of substituted-hydrocarbyl R groups include substituted-alkyl groups such as fluoromethyl, chloromethyl, bromomethyl, iodomethyl, fluoroethyl, bromoethyl, iodoethyl, 3-iodopropyl, 4-chlorobutyl, 5-bromopentyl, 4-fluorohexyl, 6-iodooctyl, methoxymethyl, 3-phenoxypropyl, 4-carbethoxybutyl, 3-oxoheptyl, 8-acetoxyoctyl, and 10-cyanodecyl; substituted-cycloalkyl groups such as 2-fluorocyclopropyl, 3-iodocyclohexyl, 4-carbomethoxycyclobutyl, 3-methoxycycloheptyl, 4-benzyloxycyclohexyl, and 2-cyanocyclopentyl; substituted alkenyl groups such as 10-iododecenyl-5, 4-cyanobutenyl-2, and 4-methoxyheptenyl-6; substituted-cycloalkenyl such as 4-methoxycyclohexenyl-2, 4-cyanocyclohexenyl-2, and 5-iodocyclohexenyl-2; and substituted-aralkyl groups such as 4-chlorobenzyl, 2-(p-chlorophenyl)propyl, 4-(1-cyanonaphthyl)pentyl and 5-(p-tolyl)-1-chlorohexyl.

Exemplary iodide compounds of formula (I) therefore include hydrocarbyl monoiodides such as alkyl iodides, e.g., 1-iodopentane, tert-amyl iodide, 1-iodohexane, 1-iodoheptane, 1-iodooctane, 1-iododecane, lauryl iodide, myristyl iodide, palmityl iodide, and stearyl iodide; alkenyl iodides, e.g., 1-iodobutene-3, 1-iodohexane-5, 1-iodooctene-7, and 1-iododecene-6; cycloalkyl iodides, e.g., cyclopentyl iodide, cyclohexyl iodide, 1-iodo-4-methylcyclohexane, 4-cyclopropylbutyl iodide, and cyclodecyl iodide; cycloalkenyl iodides, e.g., 1-iodocyclohexene-3, and 1-iodocyclooctene-4; bicyclic iodide compounds such as 2-iodobicyclo(3.3.0)octane, and aralkyl iodides, e.g., 4-phenylbutyl iodide, 5-naphthylpentyl iodide and 4-phenylcyclohexyl iodide.

Exemplary iodide compounds of formula (I) containing substituted hydrocarbyl substituents are halohydrocarbons such as dihaloalkanes, e.g., 5-bromo-1-iodopentane, 1,5-diiodopentane, 7-chloro-1-iodoheptane, 10-bromo-1-iododecane, 1,16-diiodooctadecane, and 1,19-diiodononadecane; dihalocycloalkanes, e.g., 1,4-diiodocyclohexane, 4-chloro-1-iodocyclohexane, 1,4-(diiodomethyl)cyclohexane, and (3-chloromethyl)-1-iodocyclohexane; and 4-(p-chlorophenyl)-1-iodobutane; iodide compounds containing oxygen functional groups such as 1-iodo-4- methoxybutane, 6-carbethoxyl-1-iodohexane, 1-iodo-4-oxooctane, 1-acetoxy-10-iododecane, 8-ethoxy-1-iodooctadecane, 4-chloro-1-iodocydohex-2-ene, 5-(p-acetoxyphenyl)-1-iodopentane and 16-acetoxy-1-iodohexadec-4-ene; and iodide compounds containing cyano groups such as 5-cyano-1-iodopentane, 4-cyano-1-iodocyclohexane and 4-(p-cyanophenyl)-1-iodobutane.

In general, mono-iodo compounds of formula (I) wherein the organo R and R' groups are saturated aliphatic, particularly alkyl or haloalkyl, are preferred over the R' groups containing carbon-carbon unsaturation, e.g., olefinic, acetylenic or aromatic unsaturation or other functional groups. Particularly preferred iodide compounds are those wherein two of the R and R' groups are hydrogen, e.g., primary saturated aliphatic iodides. For the most useful aspect of the invention, the preferred iodide compounds are primary saturated alkyl monoiodides of 10 to 20 carbon atoms, such as 1-iododecane, 1-iodododecane, and the like.

The use of mixtures of organic iodides is also contemplated within the scope of the invention, for example, mixtures of 1-iodopentane and 1-iodohexane or of 1-iodohexane, 1-iodooctane and 1-iodododecane. Suitable iodide compounds or mixtures are those prepared by the telomerization of ethylene and an alkyl iodide as disclosed in applicant's copending U.S. application Ser. No. 833,891, filed June 11, 1969.

The Catalyst

The exchange reaction is conducted in the presence of a catalyst comprising a Group VIII noble metal or noble metal-containing compound. The use of ruthenium, platinum, palladium, rhodium, osmium or iridium metal as the catalyst is contemplated within the scope of the invention. Particularly preferred is the use of platinum or ruthenium. The metal is employed as an unsupported material or is supported on any of a variety of known carriers, for example, silica, alumina, zirconia and the like. The catalyst may be prepared by conventional methods known in the art, such as depositing a corresponding metal salt on alumina and calcining at 300° to 550°C.

The noble metal compounds used as catalyst are inorganic binary noble metal compounds, inorganic halogenated noble metal oxo acids, inorganic salts of halogenated noble metal oxo acids and noble metal complexes.

Suitable inorganic binary noble metal compounds include platinum dichloride, platinum tetrachloride, ruthenium trichloride, rhodium trichloride, palladous chloride, osmium trichloride and iridium trichloride.

Suitable inorganic halogenated noble metal oxo acids include chloroplatinic acid, chloroosmic acid and chloroiridic acid.

Suitable inorganic salts of halogenated noble metal oxo acids include ammonium hexachloroplatinate, ammonium tetrachloroplatinate, potassium hexachloroplatinate, sodium tetrachloropalladate (II) and potassium hexachloroiridate (IV).

Suitable noble metal complexes include tris(triphenylphosphine)-platinum, bis(triphenylphosphine)ruthenium tricarbonyl, ruthenium tricarbonyl chloride, bis(triphenylphosphine)rhodium carbonyl, rhodium dicarbonyl chloride dimer, tris(triphenylphosphine)rhodium (I) chloride and bis(triphenylphosphine)-iridium carbonyl chloride. Particularly preferred are tris(triphenylphosphine)platinum and bis(triphenylphosphine)ruthenium carbonyl.

The Reaction Conditions

The exchange reaction is carried out in liquid phase in the presence of a reaction diluent that is liquid at the reaction temperature and pressure, is capable of dissolving the reactants and is inert to the reactants, catalyst and the products produced therefrom. Suitable diluents are non-hydroxylic compounds such as hydrocarbons free from aliphatic unsaturation, e.g., hexane, heptane, octane, decane, dodecane, cyclohexane, decahydronaphthalene, benzene, toluene and xylene. Preferred reaction diluents comprise mononuclear aromatic hydrocarbons of from six to 12 carbon atoms. In certain modifications of the process, a portion of the exchange product suitably serves as at least a portion of the reaction diluent and less or no added diluent is required. In most instances, however, added diluent is used and amounts of reaction diluent up to about 30 times the weight of organic iodide reactant are typically employed.

The exchange reaction is conducted by any of a variety of procedures. In one modification, the olefin, iodide reactant, catalyst and diluent are charged to an autoclave or similar pressure reactor for operation in a batchwise manner. In another modification, the process is effected in a continuous manner such as by contacting the entire reaction mixture during passage through a tubular reactor. In still another modification, one reaction component is added to the other reaction components in increments, such as by adding olefin to a reaction mixture of the organic iodide reactant and catalyst. By any modification, the process is most efficiently conducted at elevated temperature and pressure. In general, temperatures varying from about 100°C to about 250°C are satisfactory with temperatures from about 150°C to about 225°C being preferred. Suitable reaction pressures are those which serve to maintain the reaction mixture substantially in the nongaseous phase. Reaction pressures from about 10 atmospheres to about 200 atmospheres in general are satisfactory. The exchange process is suitably conducted in an inert reaction environment so that the presence of reactive materials such as water and oxygen is desirably avoided. Reaction conditions are therefore substantially anhydrous and substantially oxygen-free.

At the conclusion of the reaction, the product mixture is separated and the olefin and organic iodide products are recovered by conventional means such as fractional distillation, selective extraction, adsorption and the like.

The Exchange Reaction Products

The process of the invention comprises a reaction between the organic iodide and the olefin according to the equation

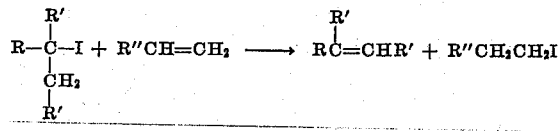

wherein R and R' are as defined above and R'' is H or $C_1^+{}_3$ hydrocarbyl.

The olefinic products are materials of established utility. For example, they are converted by conventional "Oxo" processes to aldehydes that are hydrogenated with conventional catalysts to the corresponding alcohols. The $C_{12}$–$C_{20}$ alcohol products are ethoxylated by reaction with ethylene oxide in the presence of a basic catalyst, e.g., sodium hydroxide, to form conventional nonionic detergents and the lower molecular weight alcohols are esterified by reaction with polybasic acids, such as phthalic acid, to form plasticizers for polyvinyl chlorides and like plastics.

To further illustrate the novel process of the invention, the following examples are provided. It should be understood that they are not to be regarded as limitations, as the teachings thereof may be varied as will be understood by one skilled in the art.

EXAMPLE I

An 85 ml magnetically stirred autoclave was charged with 0.5 mmoles bis(triphenylphosphine)ruthenium tricarbonyl, 30 ml benzene, and 20 millimoles 2-octyl iodide. The autoclave was pressured with ethylene such that the final pressure was 1,000–1,500 psig at 150°C. The autoclave was maintained at 150°C for 17 hours. The product comprised 17 percent octenes and ethyl iodides as well as trace amounts of higher olefins.

EXAMPLE II

The procedure of Example I was followed in reacting 20 moles cyclohexyl iodide and ethylene to produce cyclohexene and 36 percent ethyl iodide.

EXAMPLE III

A series of exchange reactions of ethylene with 1-iododecane in the presence of various platinum catalysts were conducted by charging the entire amounts of the reaction components and each catalyst into an 85 ml autoclave. Each reaction was conducted with 5 grams catalyst and 20 mmoles 1-iododecane at an initial ethylene pressure of 1,000–1,500 psig, and at a temperature of 200°C for 17 hours. The reaction conditions and results obtained are provided in Table I.

TABLE I

| Catalyst | Conversion % | Selectivity 1-decene,% | other decenes,% |
|---|---|---|---|
| none | trace | — | — |
| PtO | trace | — | — |
| $SiO_2/Al_2O_3$ [1] | trace | — | — |
| $H_2PtCl_6$ | 4 | 37 | 63 |
| $[(C_6H_5)_3P]_3Pt$ | 54 | 42 | 58 |
| $Pt/SiO_2$ [2] | 7 | 76 | 24 |
| $Pt/SiO_2$ [3] | 7 | 57 | 43 |
| $Pt/Al_2O_3$ [4] | 36 | — | — |
| $Pt/Al_2O_3$ [5] | 57 | — | — |
| $Pt/Al_2O_3$ [6] | 35 | — | — |
| $Pt/Al_2O_3$ [7] | 86 | 45 | 55 |
| $Pt/Al_2O_3$ [8] | 89 | 44 | 56 |
| $Pt/Al_2O_3$ [9] | 39 | — | — |
| $Pt/Al_2O_3$ [10] | 60 | — | — |

1) Aerocat Triple A 60/70 high alumina cracking catalyst
2) 1% Pt on Davison's 950 $SiO_2$
3) 1% Pt on Davison's 40 $SiO_2$
4) UOP R-8, calcined at 550°C
5) 1% Pt on UOP R-7
6) 1% Pt on Sinclair Baker 150 alumina, calcined at 300°C
7) 1% Pt on UOP R-7 base, impregnated with $H_2PtCl_6$
8) 1% Pt on Sinclair Baker RD 150 alumina, impregnated with $H_2PtCl_6$ and calcined at 500°C
9) 1% Pt on Alcoa C-35 (alumina hydrate)
10) 1% Pt on Harshaw Al XL, 81 m²/g.

We claim as our invention:

1. The process of effecting an exchange reaction by contacting an olefin of two to five carbon atoms and an organic iodide selected from the group consisting of organic iodides of from five to 61 carbon atoms and mixtures thereof, in which the iodine atom is bonded to a saturated carbon atom, the number of carbon atoms in the organic iodide being at least three greater than the number in the olefin, in the presence of a catalyst selected from group consisting of a) an element of a Group VIII noble metal b) tris(triphenylphosphine) platinum and c) bis(triphenylphosphine) ruthenium tricarbonyl, the exchange being carried out in liquid phase at a temperature of from about 100°C to about 225°C and; recovering the resulting olefin product having the same carbon atoms as the organic iodide.

2. The process according to claim 1 wherein the olefin reactant is ethylene.

3. The process according to claim 2 wherein the organic iodide is an iodoalkane.

4. The process according to claim 3 wherein the organic iodide is a primary alkyl iodide of 10 to 20 carbon atoms.

5. The process according to claim 4 wherein the noble metal is supported on a catalyst carrier.

6. The process according to claim 5 wherein the organic iodide is 1-iododecane, and the catalyst is platinum metal on an alumina support.

* * * * *